Patented June 5, 1951

2,555,918

UNITED STATES PATENT OFFICE 2,555,918

DI-ESTERS OF ARYL-SUBSTITUTED GLYCOLS AND THEIR PREPARATION

Donald Drake Coffman and Edward Levant Jenner, Wilmington, Del., assignors to E. I. du Pont de Nemours & Company, Wilmington, Del., a corporation of Delaware No Drawing. Application July 27, 1948, Serial No. 40,987

12 Claims. (Cl. 260—488)

This invention relates to the preparation of new alcohols and their esters and more particularly to new esters of glycols and to methods for their preparation.

When ethylenically unsaturated compounds are treated with strongly acid reagents, such as sulfuric acid, the usual reaction is polymerization or addition of the acid to the double bond. The compounds obtained by either of these reactions have a single terminal functional group.

It is an object of this invention to prepare new alcohols and their esters. A further object is to provide new esters of glycols and methods for their preparation. A still further object is to provide di-esters of glycols containing a plurality of arylethylene units. Other objects will appear hereinafter.

The objects of this invention are accomplished by providing glycols and their carboxylic esters having the formula

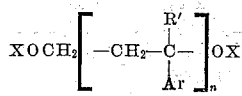

where $n$ is an integer at least equal to 2, R' is H or $CH_3$, Ar is an aryl radical of from 6 to 10 carbon atoms, and X is H or an acyl radical. When X is an acyl radical, it is preferably alkanoyl of from 2 to 6 carbon atoms and more preferably is acetyl. Ar is preferably phenyl. The integer $n$ is usually from 2 to 8.

It has now been found that esters of glycols containing a plurality of arylethylene units are obtained by the treatment of at least two molecular equivalents of a monoarylethylene with no more than one molecular equivalent of formaldehyde in the presence of a carboxylic acid which is liquid at 40° C. and which has not more than two carboxylic acid groups, and in the presence of an oxygen-containing acid the ionization constant of which in absolute ethanol is greater than 0.001. The reaction is carried out under anhydrous conditions.

In general the process of this invention is carried out by reacting the arylethylene, e. g., styrene, with formaldehyde and a carboxylic acid such as acetic acid, in the presence of an acid such as sulfuric acid or $BF_3 \cdot HOOCCH_3$ for usually 2 to 50 hours at approximately room temperature. The glycols can be prepared from their esters by hydrolysis.

The following examples in which the parts are by weight further illustrate the practice of this invention.

EXAMPLE I

To a solution of 60 parts of formaldehyde (introduced as paraformaldehyde), and 68 parts of boron fluoride in 735 parts of acetic acid there was added 500 parts of styrene. A clear solution was obtained. The exothermic heat of reaction raised the temperature from 25° C. to 40° C., although the mixture was cooled in an ice bath. The mixture was held at room temperature for three days and the reaction was terminated by adding ice and 200 parts of 20 molar sodium hydroxide solution. Water was added, and the organic product was separated, washed with water, and dried over calcium sulfate. The product was then distilled through a 10″ Vigreux column under reduced pressure.

*Fractional distillation of the obtained glycol diacetates*

| | $CH_3COOCH_2(CH_2CHC_6H_5)_nOOCCH_3$ | | |
|---|---|---|---|
| | B. P. | Weight | $n_D^{25}$ |
| | | Parts | |
| 1 | 42° C./16 mm | 16.7 | 1.5409 |
| 2 | 48–96° C./16 mm | 9.0 | 1.5219 |
| 3 | 104° C./16mm.–117° C./2.8 mm | 24.5 | 1.4971 |
| 4 | 114–141° C./2.8 mm | 21.7 | 1.5025 |
| 5 | 143° C./2.8 mm | 28.0 | 1.4969 |
| 6 | 143° C./2.8 mm | 24.9 | 1.4959 |
| 7 | 143–144° C./2.8 mm | 16.9 | 1.4955 |
| 8 | 116° C./0.6 mm | 24.7 | 1.4978 |
| 9 | 117° C./0.6 mm | 22.2 | 1.4993 |
| 10 | 121–122° C./0.6 mm | 23.3 | 1.5018 |
| 11 | 122–140° C./0.6 mm | 22.1 | 1.5189 |
| 12 | 141–146° C./0.6 mm | 10.2 | 1.5289 |
| 13 | 157–168° C./0.6 mm | 26.3 | 1.5475 |
| 14 | 177–184° C./0.6 mm | 23.6 | 1.5321 |
| 15 | 183–188° C./0.6 mm | 21.4 | 1.5341 |
| 16 | 193–196° C./0.8 mm | 16.7 | 1.5349 |
| Residue | | 285.4 | |

The weights of the Fractions 3 through "Residue" inclusive total 591.9 parts. The molecular weight distribution may be represented as follows: Fractions 3 through 11 total 208.3 parts (35% of the product), and contain one styrene unit; Fractions 12 through 16 weigh 98.2 parts (17% of the product), and consist of products containing two styrene units, whereas the residue, 285.4 g. (48%) represents material containing more than two styrene units.

The analysis of fraction 15 indicates that it is principally the diacetate of a glycol containing 1 formaldehyde and 2 styrene units.

Anal.: Calcd. for

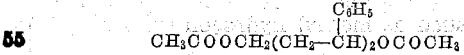

Sap. Eq., 170.2; C, 74.09; H, 7.11; Hydroxyl No., 0. Found: Sap. Eq., 194.9, 194.8; C, 75.15; H, 7.19; Hydroxyl No., 3.3.

The analysis of the still residue indicates that it is principally a mixture of glycol diacetates, and that its composition averages approximately five styrene units per molecule.

Anal.: Calcd. for

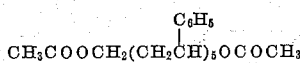
$$CH_3COOCH_2(CH_2CH)_5OCOCH_3$$
with $C_6H_5$ substituent

Sap. Eq., 326.4; Mol. wt., 652.8, C, 82.79; H, 7.41. Found: Sap. Eq., 320.6, 312.8; Mol. wt., 636, 606, C, 81.35; H, 7.45.

Fractions 15 and 16 were combined and saponified by refluxing in a solution of sodium hydroxide in aqueous alcohol. The glycol which was formed was extracted with toluene and distilled. The distillate boiled at 200° C./0.5 mm. The analysis of the distillate indicated that it was the glycol.

Anal.: Calcd. for.

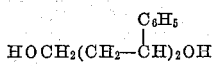
$$HOCH_2(CH_2-CH)_2OH$$
with $C_6H_5$ substituent

Hydroxyl No., 128.2; C, 79.65; H, 7.87. Found: Hydroxyl No., 147.0, 144.7; C, 79.64; H, 8.00. The glycol reacted with phenyl isocyanate but did not give a crystalline derivative.

EXAMPLE II

The process of Example I was repeated excepted that 100 parts of sulfuric acid was used in place of the boron trifluoride. Upon distillation of the product there was obtained 321.2 parts (51% of the product) which had one styrene unit, 217.2 parts (34%) which had two styrene units and 96.5 parts (15%) which had more than two styrene units per each glycol ester.

The process of this invention is generic to the reaction of monoarylethylenes of the formula $ArCR'=CH_2$ where Ar is an aryl radical of 6 to 10 carbon atoms and R' is methyl or hydrogen. Examples of such monoarylethylenes include alphamethyl styrene, tolyl ethylene, duryl ethylene, and vinyl naphthalene. Nuclearly substituted monorylethylenes, for example, mono- and dichlorostyrene and methoxystyrene are also included. Of these polymerizable monoarylethylenes, styrene is most readily available and is preferable. These polymerizable monoarylethylenes contain a total of from 8 to 13 carbon atoms.

Formaldehyde is present as formaldehyde itself or is liberated in situ from such compounds as paraformaldehyde, trioxane, or methylene diacetate. Under the conditions of the reaction these compounds are sources of formaldehyde in substantial amounts. The process is carried out in an anhydrous system.

The oxygen-containing acids include those whose acidic dissociation constants in absolute ethanol are at least 0.001 [see A. J. Deyrup, J. Am. Chem. Soc. 56, 63 (1934) and L. P. Hammett, Physical Organic Chemistry, McGraw-Hill Book Company (1940) page 261]. The preferred catalysts are $BF_3 \cdot CH_3COOH$ and similar acids which are association products of $BF_3$ with alkanoic acids of, for example, 1–6 carbons; sulfuric acid, perchloric acid, fluosulfonic acid and methanetrisulfonic acid. Other useful catalysts include hydrocarbon sulfonic acids such as benzenesulfonic acid, toluenesulfonic acid, methanesulfonic acid, ethanedisulfonic acid, monoesters of sulfuric acid such as methyl hydrogen sulfate and butyl hydrogen sulfate; difluophosphoric acid; and chlorosulfonic acid.

The carboxylic acids that are employed in the process of this invention are preferably those which are liquid at 40° C., have not more than 2 carboxylic acid groups and, apart from the carboxyl, the remainder of the carboxylic acid molecule is hydrocarbon. Monocarboxylic acids of 1–6 carbons, especially the alkanoic acids of the formula $C_nH_{2n+1}COOH$ where $n$ is a cardinal number up to 5, and those alkenoic acids of up to 6 carbon atoms having the ethylenic double bond conjugated with the carbonyl of the carboxyl group are generally used. Illustrative acids that may be employed are formic, acetic, propionic, butyric, caproic, trimethylacetic, acrylic, crotonic, chloroacetic, trifluoroacetic, oxalic, phenylacetic, and monomethyl adipate. When the acid employed is not a liquid at the temperature of the reaction, a solvent such as nitrobenzene, the lower nitrohydrocarbons or halogenated hydrocarbons such as chlorobenzene and trichloroethylene should be present.

The reaction may be carried out at a temperature of −40 to 100° C., although 20–50° C. is generally used. The time of reaction may be as little as a few minutes, although the duration of the reaction is generally 2–100 hours. The time and temperature employed are interdependent variables and also depend on the concentration of the reactants.

In the reaction of the monoarylethylene, formaldehyde and carboxylic acid, the arylethylene is present in amounts which are on a molar basis in excess of the amount of formaldehyde. On a molar basis the ratio of styrene or similar arylethylene to formaldehyde is at least 2 to 1 and may be much higher, e. g., 10 to 1. Generally the strong acid catalyst is present in quantities of 0.05 to 0.5 part on a weight basis per part of carboxylic acid. In general the ratio on a weight basis of arylethylene to carboxylic acid is between 0.02–5 per part of acid, or on a molar basis, the ratio is between one to ten moles of carboxylic acid per mole of arylethylene.

The preferred products of this invention may be represented by the formula

$$XOCH_2(CH_2CHC_6H_5)_nOX$$

where $n$ is an integer of at least 2 and preferably from 2 to 8, and X is H or alkanoyl of from 2 to 6 carbon atoms. The preferred esters of this invention may be represented by the formula

$$RCOOCH_2(CH_2CHC_6H_5)_nOOCR$$

where $n$ is an integer of at least 2, preferably from 2 to 8, and R is a lower alkyl radical, that is from 1 to 5 carbon atoms. RCO is thus preferably alkanoyl of from 2 to 6 carbon atoms.

As shown in the examples the higher molecular weight products average about 5 phenylethylene units per molecule. Representative compounds obtained by this invention are the diacetates of 1,3-diphenylpentane-1,5-diol and 1,3,5-triphenylheptane-1,7-diol.

The products of this invention may be used as plasticizers or adjuvants for lubricants or as intermediates. For example, hydrolysis gives the glycols. Other derivatives can be prepared from the esters and glycols.

As many apparently widely different embodiments of this invention may be made without departing from the spirit and scope thereof, it is to be understood that this invention is not limited to the specific embodiments thereof except as defined in the appended claims.

We claim:

1. A di-ester containing a plurality of arylethylene units having the formula

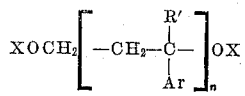

where $n$ is an integer from 2 to 8, Ar is phenyl, R' is a member of the group consisting of hydrogen and methyl and X is alkanoyl of from 2 to 6 carbon atoms.

2. A di-ester containing a plurality of arylethylene units having the formula

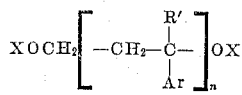

wherein $n$ is an integer from 2 to 8, Ar is phenyl, R' is hydrogen and X is alkanoyl of from 2 to 6 carbon atoms.

3. A di-ester containing a plurality of arylethylene units having the formula

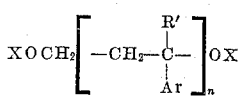

wherein $n$ is an integer from 2 to 8, Ar is phenyl, R' is methyl and X is acetyl.

4. A di-ester containing a plurality of arylethylene units having the formula $$CH_3COOCH_2(CH_2CHC_6H_5)_nOOCCH_3$$

where $n$ is an integer from 2 to 8.

5. The di-ester containing a plurality of arylethylene units having the formula $$CH_3COOCH_2(CH_2CHC_6H_5)_2OOCCH_3$$

6. A process which comprises treating under anhydrous conditions one molecular equivalent of formaldehyde with at least two molecular equivalents of a monoarylethylene containing from 8 to 13 carbon atoms in the presence of a carboxylic acid which is liquid at 40° C. and contains not more than two carboxylic acid groups and in the presence of an oxygen-containing acid having an ionization constant in absolute ethanol greater than 0.001, and separating therefrom a di-ester containing a plurality of arylethylene units.

7. A process as set forth in claim 6 wherein said carboxylic acid is an alkanoic monocarboxylic acid.

8. A process as set forth in claim 6 wherein said monoarylethylene is styrene.

9. A process which comprises treating under anhydrous conditions one molecular equivalent of formaldehyde with at least two molecular equivalents of styrene in the presence of an alkanoic monocarboxylic acid of from 2 to 8 carbon atoms and in the presence of an oxygen-containing acid having an ionization constant in absolute ethanol greater than 0.001, and separating therefrom a di-ester containing a plurality of phenylethylene units.

10. A process which comprises treating under anhydrous conditions one molecular equivalent of formaldehyde with at least two molecular equivalents of styrene in the presence of acetic acid and in the presence of an oxygen-containing acid having an ionization constant in absolute ethanol greater than 0.001 and separating therefrom a diacetate containing a plurality of phenylethylene units.

11. A process as set forth in claim 10 wherein said oxygen-containing acid is an association product of boron trifluoride and acetic acid.

12. The di-ester containing a plurality of arylethylene units having the formula $$CH_3COOCH_2(CH_2CHC_6H_5)_5OOCCH_3$$

DONALD DRAKE COFFMAN.
EDWARD LEVANT JENNER.

No references cited.